United States Patent [19]
Sibigtroth

[11] Patent Number: 5,454,092
[45] Date of Patent: Sep. 26, 1995

[54] MICROCOMPUTER HAVING AN IMPROVED INTERNAL ADDRESS MAPPING APPARATUS

[75] Inventor: James M. Sibigtroth, Round Rock, Tex.

[73] Assignee: Motorola, Inc., Schaumburg, Ill.

[21] Appl. No.: 151,719

[22] Filed: Nov. 15, 1993

Related U.S. Application Data

[63] Continuation of Ser. No. 650,133, Feb. 4, 1991, abandoned.

[51] Int. Cl.$^6$ ...................................... G06F 12/00
[52] U.S. Cl. .................................... 395/412; 364/DIG. 1; 364/255.1; 364/255; 364/255.8; 364/245.2; 364/245; 364/246; 364/246.3; 395/823; 395/431
[58] Field of Search ...................... 395/400, 425

[56] References Cited

U.S. PATENT DOCUMENTS

| | | | |
|---|---|---|---|
| 4,649,476 | 3/1987 | Sibigtroth | 395/400 |
| 4,802,119 | 1/1989 | Heene et al. | 395/400 |
| 4,922,451 | 5/1990 | Lo et al. | 395/400 |
| 5,093,776 | 3/1992 | Morss et al. | 395/400 |
| 5,243,700 | 9/1993 | Larsen et al. | 395/275 |

*Primary Examiner*—Rebecca L. Rudolph
*Attorney, Agent, or Firm*—James M. Sibigtroth

[57] ABSTRACT

An improved internal memory address mapping apparatus repositions a lower priority memory resource when two or more memory resources are located at the same address space. Upon receipt of a signal indicating that two memory resources have been mapped to the same address space, an internal address mapping decoder assigns the conflicting portion of the memory resource with the lower priority a different address range. The portion of the memory resource with the lower priority not conflicting with another memory resource is accessed without being repositioned. This internal memory address mapping apparatus assures that all portions of conflicting memory resources remain accessible to the user.

9 Claims, 5 Drawing Sheets

MICROCOMPUTER HAVING AN IMPROVED INTERNAL ADDRESS MAPPING APPARATUS

This application is a continuation of prior application Ser. No. 07/650,133, filed Feb. 4, 1991, now abandoned.

FIELD OF THE INVENTION

This invention relates generally to microcomputers, and more particularly, to a microcomputer having an internal memory address mapping apparatus.

BACKGROUND OF THE INVENTION

During operation, some microcomputers assign, or map, memory resources such as RAM, ROM, and Input/Output (I/O) registers to a unique address range from which the user may access them. Flexibility in determining the address range for each memory resource is desirable for general purpose microcomputers. This flexibility allows the user to position the most frequently used memory resources in the more quickly accessed address ranges. In some general microcontrollers, the first portion of memory is located in the "direct addressing mode" range. Instructions which use the direct addressing mode assume that the high order byte of a sixteen bit address is $00. The instructions may then be accessed with a one byte address rather than a two byte address. Therefore, the instructions use one less byte of memory space and are serviced in at least one less cycle of execution time than instructions in other addressing ranges. Maximum efficiency may then be achieved by locating the most frequently accessed memory resources in the direct addressing mode address space. The user may also modify the address range of memory resources in the microcomputer to insure compatibility with the memory resources of external systems.

In earlier microcontrollers, such as the Motorola MC68HC11A8, the user modifies the position of RAM and I/O register memory resources in a memory map by programming predetermined bits in the map register. Following the repositioning of the memory resources, however, portions of the relocated resources may be overlapped. Address decode logic within the microcomputer is provided to protect against such conflicts among memory resources. Prioritization logic disables the least important resource and allows the more important resource to be accessed without interference. For example, if an overlap between internal RAM memory address locations and the I/O register address locations occurs, the lower priority internal RAM address locations are disabled and the I/O registers are accessed without interference. The internal RAM memory addresses which overlap the addresses of the I/O registers will always be disabled so those addresses can no longer be used for the storage of information. The internal RAM is often limited in size, however, and the user may not be able to sacrifice the portion of the RAM which conflicts with a higher priority memory resource. For example, in the MC68HC11A8, if both the I/O register block and the internal RAM memory resources are positioned at the same starting address, a quarter of the internal RAM memory resource is disabled. Because such a significant portion of the internal RAM is disabled, the user might be forced to sacrifice the most efficient operation of the system to insure that adequate memory space exists. U.S. Pat. No. 4,649,476 discusses the MC68HC11A8 implementation in greater detail and is hereby incorporated herein by reference.

SUMMARY OF THE INVENTION

The previously mentioned needs are fulfilled with the present invention. Accordingly, there is provided, in one form, a microcomputer with an internal address mapper. The microcomputer is comprised of an address bus, a first resource coupled to the address bus and having an enable input, a second resource coupled to the address bus and having an enable input, and an address mapper. The address mapper comprises a map register portion for storing a first digital value and a second digital value. A first comparator portion is coupled to the map register portion and the address bus. The first comparator portion provides a first match signal if the first digital value of the map register portion and a first portion of an address on the address bus are identical. A first address decoder portion is coupled to the output of the first comparator portion and a second portion of an address bus. The first address decoder portion provides an enable signal to the enable input of the first resource when the first match signal is asserted and a second portion of the address on the address bus meets predetermined criteria. A second comparator portion is coupled to the map register portion and to the address bus. The second comparator portion provides a second match signal when the second digital value of the map register portion and the fist portion of the address on the address bus are identical.

The improvement of the present invention comprises a first logic portion which is coupled to receive the first digital value and the second digital value of the map register portion. The fist logic portion provides a first control signal to the second decoder portion only if the first digital value of the map register portion is identical to the second digital value of the map register portion. The second address decoder portion is coupled to the second match signal, the first control signal, and a third portion of the address on the address bus. The second address decoder portion provides an enable signal to the enable input of the second resource when the second match signal and first control signal are asserted, and the third portion of the address on the address bus meets predetermined criteria.

These and other features, and advantages, will be more clearly understood from the following detailed description taken in conjunction with the accompanying drawings.

DETAILED DESCRIPTION OF A PREFERRED EMBODIMENT

Figure 1:
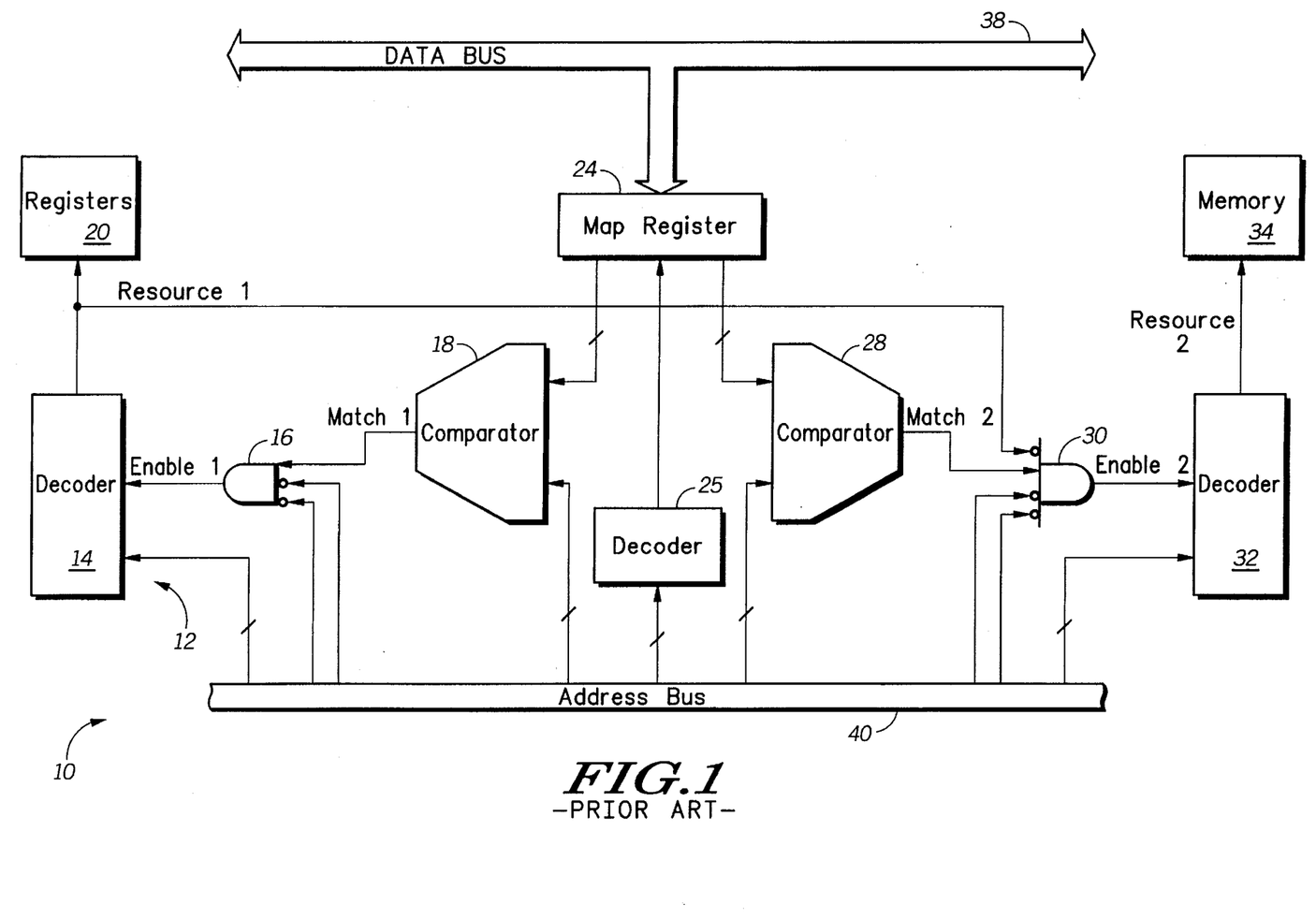
FIG. 1 illustrates in block diagram form a typical internal address mapper.

Illustrated in FIG. 1 is a block diagram of an internal address mapping apparatus 10 used by earlier microcomputer devices such as the Motorola MC68HC11A8. The internal address mapping apparatus 10 allows the user to determine address range of memory resources enabled by the microcomputer. In response to a predetermined address on an address bus 40, a decoder 25 enables a map register 24 to store addresses of the memory resources from a data bus 38. The user of the system typically programs the starting addresses of the memory resources to the map register 24 immediately following a reset signal or power-up. Each memory resource is assigned a resource map address through eider a user program or a default value in the system. A first resource map address and a first set of bits from address bus 40 will be coupled to a comparator 18. Assume, in this example, that the first set of bits corresponds to the high order bits on Address bus 40. If the first resource map address is identical to the first set of predetermined bits from address bus 40, comparator 18 will assert a signal labelled "Match 1" provided to a first input of AND gate 16. A second set of bits on address bus 40 provides a plurality of inputs to AND gate 16. The AND gate 16 provides a signal labelled "Enable 1". Assume, in this example, that the second set of bits corresponds to a balance of bits which are not included in either the high order bits or the low order bits on Address bus 40. When each of the balance of bits is equal to zero the Enable 1 signal enables an address decoder 14 of a particular memory resource to respond to a third set of predetermined corresponding to the low order bits on bits address bus 40. The output of the address decoder 14 is a signal labelled Resource 1 which enables a first memory resource 20. Thus, the decoder 14 is enabled when the address on address bus 40 is within the address range specified by the user as the first resource map address stored in the map register 24.

Similarly, a second resource map address and a fourth set of predetermined bits from address bus 40 are coupled to a comparator 28. Assume, in this example, that the fourth set of bits corresponds to the high order bits on Address bus 40. When the second resource map address is identical to the fourth set of predetermined bits on address bus 40, comparator 28 asserts a signal labelled "Match 2". The Match 2 signal is coupled to a first input of an AND gate 30. The Resource 1 signal is inverted and is then connected to a second input of AND gate 30. A fifth set of bits on address bus 40 provides a plurality of inputs to AND gate 30. Assume, in this example, that the fifth set of bits corresponds to a balance of bits which are not included in either the high order bits or the low order bits on Address bus 40. The output of AND gate 30 is a signal labelled "Enable 2". Then the Enable 2 signal is asserted, the address decoder 32 of a second memory resource 34 is enabled to respond to a sixth set of bits, the low order bits on address bus 40. The output of address decoder 32 is a signal labelled "Resource 2". The Resource 2 signal enables the second memory resource 34.

Often the user may want both a register block and an internal RAM to be in the address range which is accessed the most quickly, the direct addressing mode range. When the first and second resource map addresses are identical, both memory resources are located at the same starting address in memory. The sizes of the memory resources are not usually identical and only a portion of a memory resource is generally disabled. For example, assume that the size of the internal RAM is larger than the register block and that both resources are located at the same starting address. Because the register block has a higher priority level than the internal RAM, a first portion of the internal RAM which overlaps the register block is disabled. However, a second portion of the internal RAM memory resource which is not conflicting with the register block is accessible by the user of a system.

The internal address mapping apparatus 10 discussed above resolves the address conflict of the two memory resources by automatically disabling a portion of the memory resource with the lower priority. The output of decoder 14 is the Resource 1 signal which provides a second input to AND gate 30. Therefore, when the Resource 1 signal is asserted, the Resource 2 signal is not enabled and a portion of the memory resource positioned at the conflicting address locations is disabled.

Figure 2:
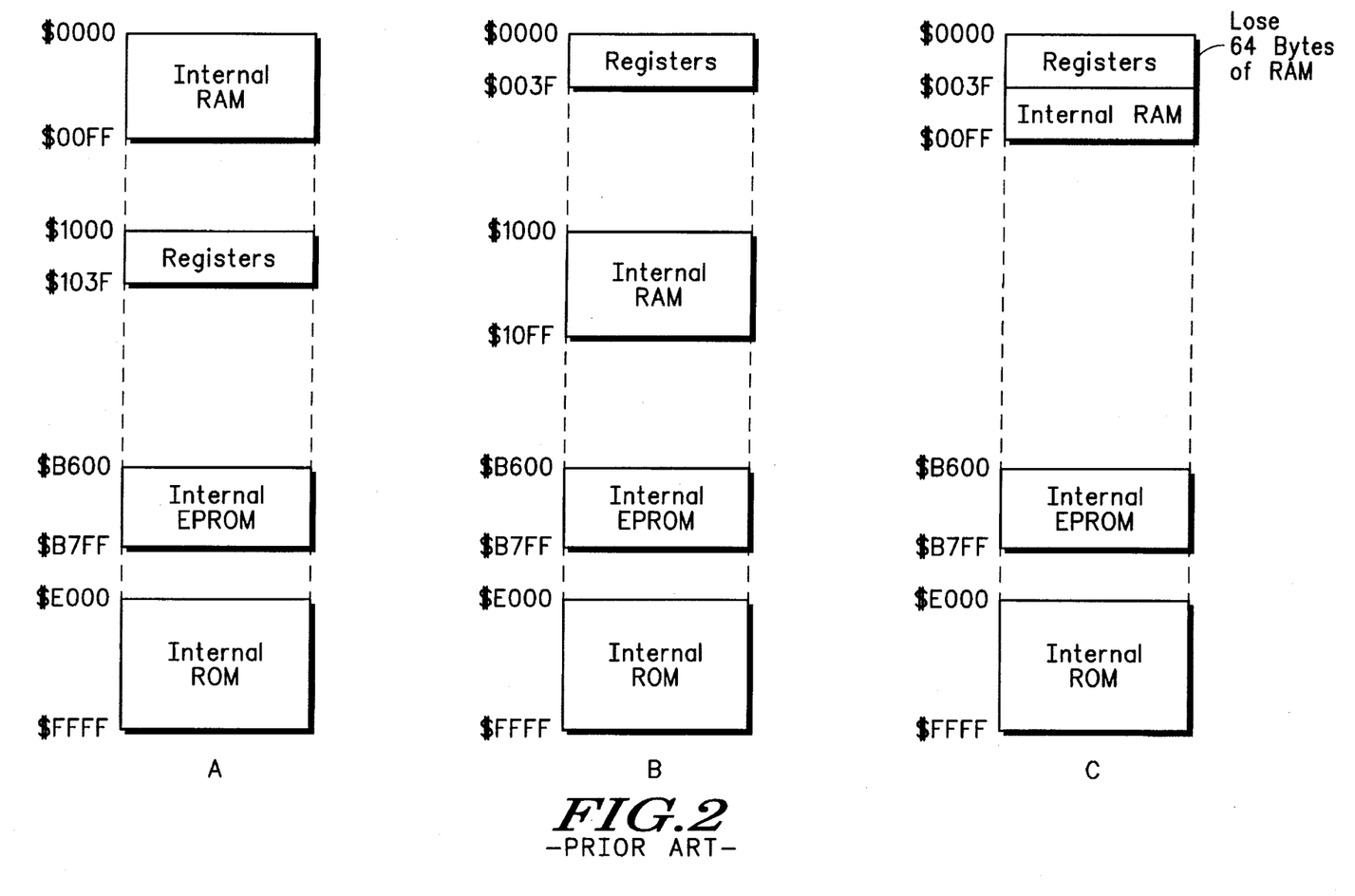
FIG. 2 illustrates a memory map of a typical microcomputer which has an internal address mapper.

FIG. 2 illustrates in a memory map diagram several possible address configurations of memory resources which have been adjusted using the internal address mapping apparatus 10 discussed above. In FIG. 2A, an internal RAM is assigned to the most quickly accessed address space, the direct addressing mode range which extends from address $0000 to address $00FF. The register block is assigned to an address space which is accessed more slowly. In FIG. 2B, the register block is located in the direct addressing mode range and the internal RAM is located in a different address range. FIG. 2C illustrates the conflict which occurs when two memory resources are positioned at the same address location. Assume that the register block has the highest priority in this example. Therefore, the register block is mapped into a portion of the direct addressing mode range, and the internal RAM is located in the remaining portion of the direct addressing mode range. A section of the internal RAM which overlaps the register block memory addresses is disabled and is no longer accessible. A significant portion of the internal RAM is often disabled and the user might be forced to sacrifice the most efficient operation of the system to insure that adequate memory space exists. U.S. Pat. No. 4,649,476 discusses the internal address mapping apparatus 10 in greater detail.

Figure 3:
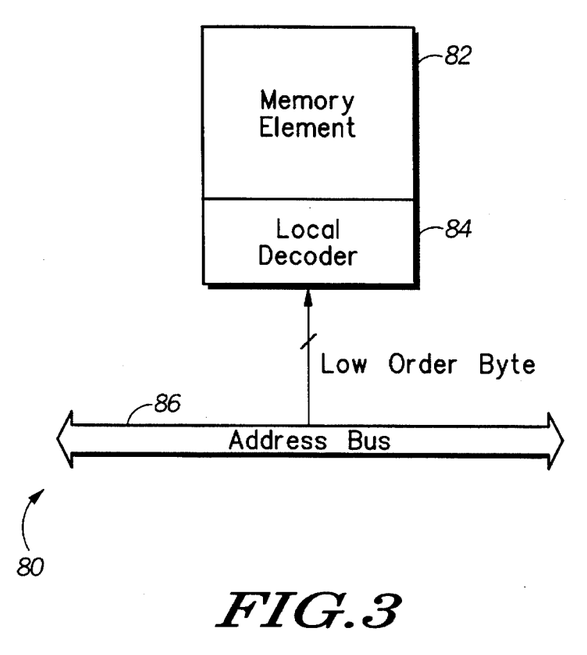
FIG. 3 illustrates in block diagram form a typical memory resource which has a local decoder.

Illustrated in FIG. 3 in block diagram form is a typical memory resource 80 generally comprised of an address bus 86, a local decoder 84, and a memory element 82. In this example, the low order byte of the address on address bus 86 is connected to the local decoder 84. The local decoder 84 then manipulates those bits to enable a unique address in the memory element 82. Eight address bits are input to the local decoder 84 to enable 256 unique addresses in the memory element 82. The high order byte of the address on address bus 86 is not connected to the local decoder 84. Therefore, as the high order byte of the address increments, the memory resource 80 is repeated, or mirrored, to another address space every 256 bytes. Assume that the address range of memory resource 80 begins at address $0000 and extends 256 locations to address $00FF. Memory resource 80 is then mirrored every 256 bytes throughout the address space. For example, the memory resource 80 located from address $0000 to address $00FF is mirrored from address $0100 to address $01FF. However, the Resource 1 signal and Resource 2 signal of the internal address mapping apparatus 10 illustrated in FIG. 1 only enable the local decoder of each memory resource for one specified address range. The conflict occurring between two memory resources located at the same starting address may, therefore, be resolved if the starting address of the overlapped portion of the lower priority memory resource is modified to enable another address space in which the memory resource is mirrored. The conflicting portion of the lower priority memory resource is then accessed from another address range and is not simply disabled.

Figure 4:
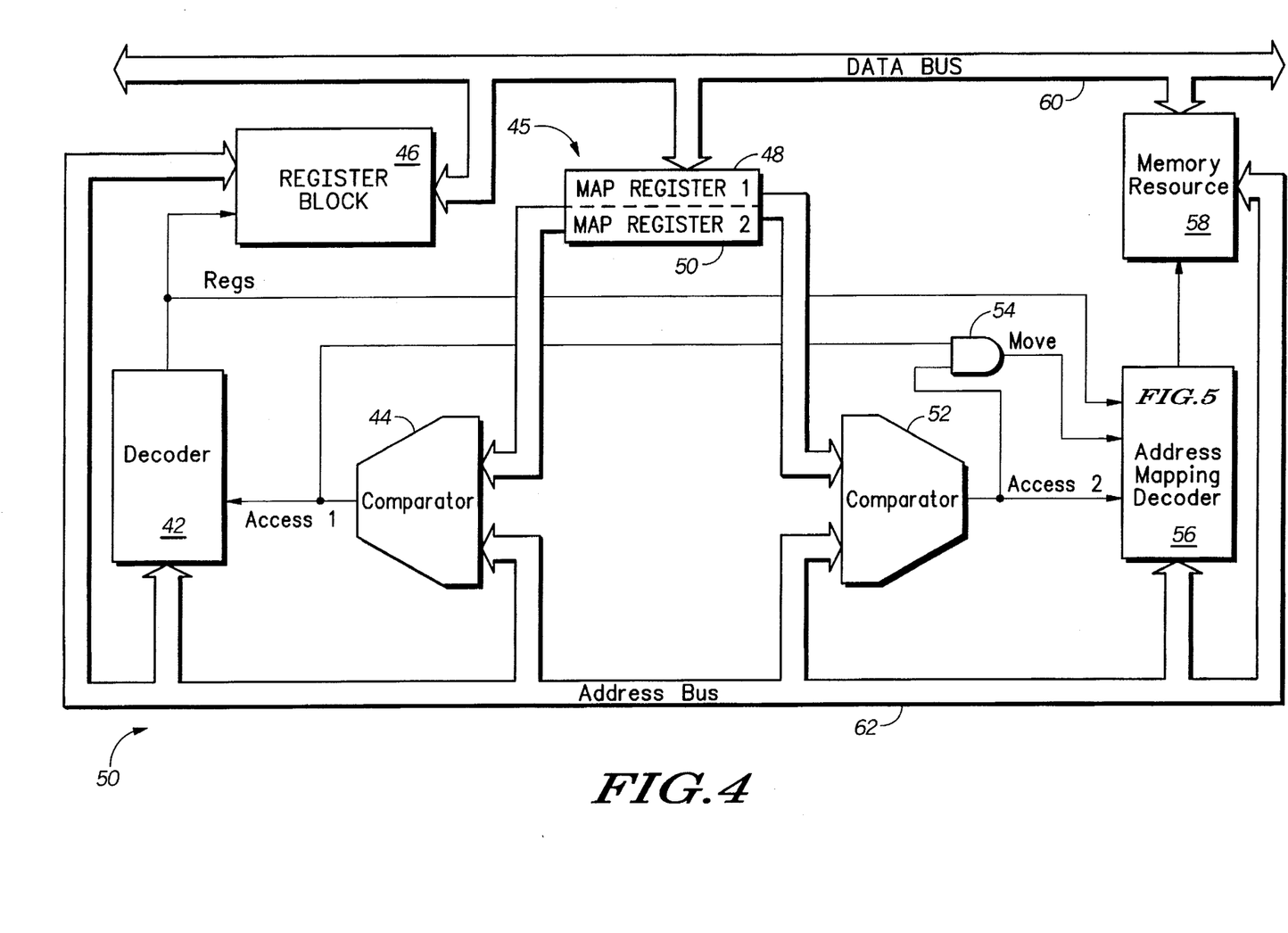
FIG. 4 illustrates in block diagram form an internal address mapper in accordance with the present invention.

Illustrated in FIG. 4 is a block diagram form of an improved address mapping apparatus 50 generally comprised of a data bus 60, an address bus 62, a register block 46, a map register 45 divided into a first portion 48 and a second portion 50, an address decoder 42, a first comparator 44, a second comparator 52, an AND gate 54, an address mapping decoder 56, and a memory resource 58.

Like the internal address mapping apparatus 10 illustrated in FIG. 1, the map register 45 stores the encoded address of the memory resources in the microcomputer. The starting addresses of the memory resources are typically programmed to the map register 45 by the user of the system immediately following a reset signal or power-up. By enabling predetermined bits in the map register 45, the starting addresses of memory resources are modified. In this example, the first map register 48 portion contains an encoded address of a first memory resource portion, the register block 46, and is coupled to a first input of a comparator 44. A first portion of address bus 62 with a first set of predetermined bits is coupled to the second input of comparator 44. Assume, in this example, that the first set of bits corresponds to the high order bits on address bus 62. The output of comparator 44 is a signal labelled "Access 1". The Access 1 signal enables the address decoder 42 of the first memory resource to respond to a second set of bits on address bus 62. Assume, in this example, that the second set of bits corresponds to the low order bits on address bus 62. The Access 1 signal also provides a first input to AND gate 54. The output of decoder 42 is a signal labelled "Regs". The Regs signal enables the register block 46 and provides a first input to address map decoder 56. The Regs signal is only asserted when the address on address bus 62 is within an address range specified by the user as the first resource map address stored in the first map register portion 48. Therefore, the register block 46 is only enabled when the address on the address bus 62 is within the specified address range.

Similarly, the second map register portion 50 stores an encoded value of the second resource map address and provides a first input to the second comparator 52. Assume, in this example, that the third set of bits corresponds to the high order bits on address bus 62. A third set of bits from address bus 62 provides a second input to second comparator 52. The output of comparator 52 is a signal labelled "Access 2" and is asserted when the encoded value of the second resource map address and the third set of predetermined address bits are identical. The Access 2 signal is connected to a second input of AND gate 54 and a second input of the address mapping decoder 56. The output of AND gate 54 is a signal labelled "Move" which is asserted if both the Access 1 signal and the Access 2 signal are enabled and indicates that the starting addresses of both memory resources are identical. The Move signal provides a third input to the address mapping decoder 56.

Figure 5:
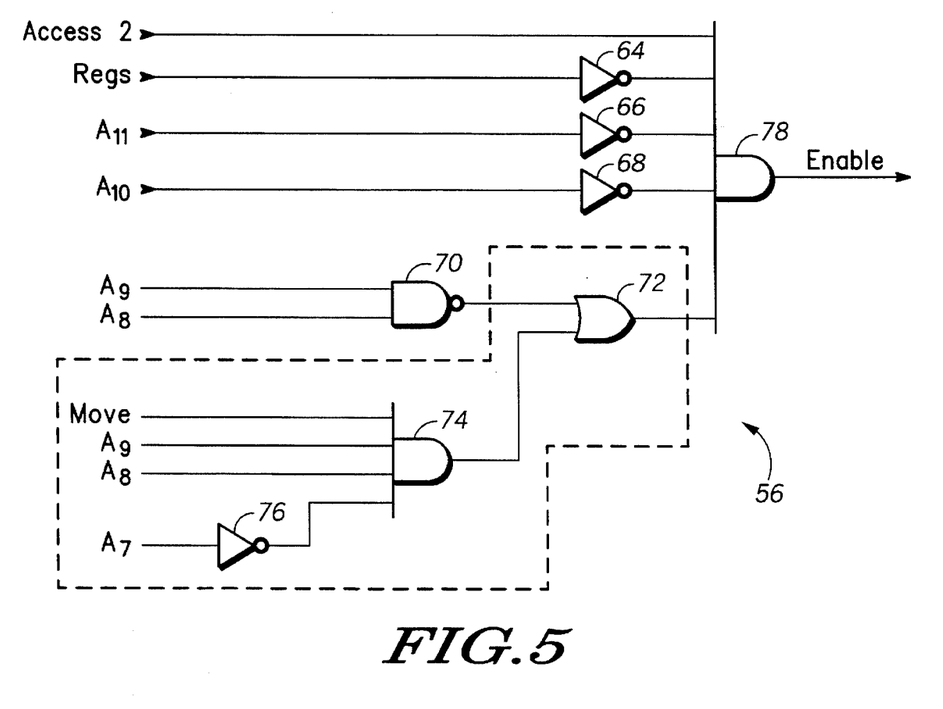
FIG. 5 illustrates in logic diagram form a possible second decode portion implementation in accordance with FIG. 4.

The address mapping decoder 56 is illustrated in logic diagram form in FIG. 5 and is generally comprised of an inverter 64, an inverter 66, an inverter 68, a NAND gate 70, an OR gate 72, an AND gate 74, an inverter 76, and an AND gate 78. The Access 2 signal provides the first input to AND gate 78. The Regs signal provides an input to inverter 64. The output of inverter 64 is connected to a second input of AND gate 78. The inputs to inverters 66 and 68 are a predetermined fourth set of address bits from address bus 62 which defines an address range that accesses the entire contents of both the first and second memory resources. In the example described herein, the fourth set of bits includes bits ten and eleven (A10 and A11, respectively) of the address on address bus 62. The output of inverters 66 and 68 are a third and a fourth input of AND gate 78 respectively. A fifth set of address bits defines the address range of only the second memory resource and provides a plurality of inputs to NAND gate 70. In the example described herein, the fifth set of bits generally includes bits eight and nine (A8 and A9, respectively) of the address on address bus 62. The output of NAND gate 70 is connected to a first input of OR gate 72. The Move signal provides a first input to AND gate 74. A predetermined sixth set of address bits defines the repositioned address location of the conflicting portion of the memory resource and provides a plurality of inputs to AND gate 74. In the example described herein, the sixth set of bits generally includes bits seven, eight, and nine (A7, A8, and A9) on address bus 62. The output of AND gate 74 is connected to a second input of OR gate 72. The output of OR gate 72 is connected to a fifth input of AND gate 78. The output of AND gate 78 enables the second memory resource 58.

The addition of AND gate 54 and a portion of the address mapping decoder 56 comprised of AND gate 74 and OR gate 72 in the improved address mapping apparatus 50 result in a unique response to a conflict between the address spaces of two memory resources. The conflicting portion of the memory resource which has a lower priority is not disabled; the address mapping decoder allows the conflicting memory resource portion to be relocated to another address location where said memory is accessible by the user.

Figure 6:
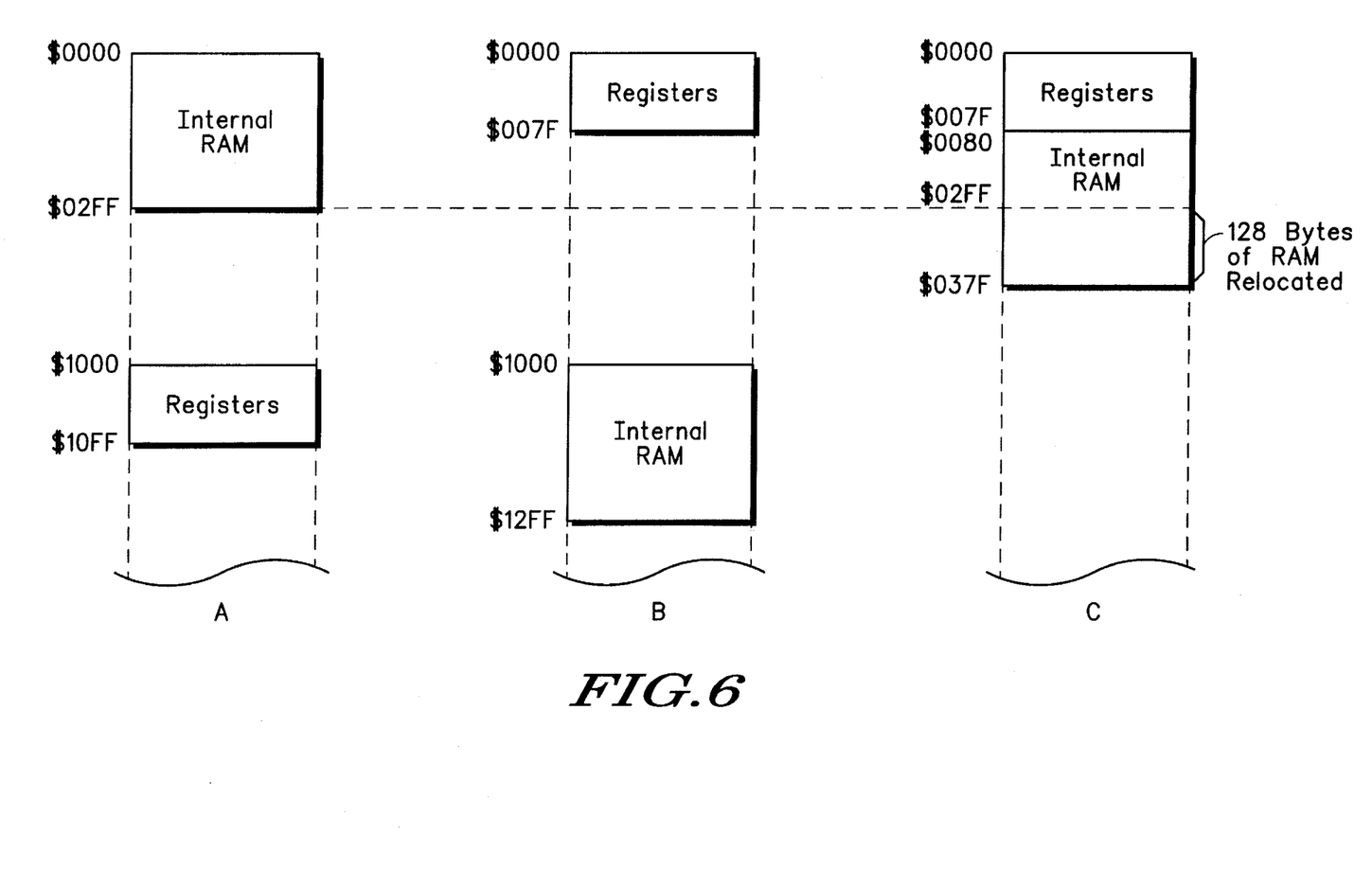
FIG. 6 illustrates a memory map of the internal address mapper of FIG. 4.

FIG. 6 illustrates in a memory map diagram three possible address range configurations of memory resources which have been adjusted using the improved address mapping apparatus illustrated in FIG. 4. In FIG. 6A, an internal RAM is positioned in the direct addressing mode range and is thereby afforded quick access time. A register block is located in another addressing mode range which does not provide for quick accessing time. FIG. 6B illustrates the register block in the direct addressing mode range and the internal RAM in another addressing mode location. In both FIG. 6A and FIG. 6B, a conflict does not occur between the address space of the memory resources and only one memory resource has been assigned to the direct addressing mode range. In the address range configurations illustrated in memory map diagrams FIG. 6A and FIG. 6B, the user sacrifices maximum system efficiency to have full access to all portions of the memory resources. FIG. 6C illustrates the unique solution to conflicting portions of memory resources provided by the improved address mapping apparatus illustrated in FIG. 4. In this example, both the register block and the internal RAM have been assigned to the direct addressing mode range. Prioritization logic is utilized to determine that the register block has priority over the internal RAM. Therefore, the register block begins at address $0000 and ends at address $007F. The user may then access the entire portion of the internal RAM from address location $0080 to $037F. The portion of the internal RAM underlying the register block was relocated from address location $0000 to address location $0300. In this example, 128 bytes of internal RAM were relocated and made accessible to the user. The portion of internal RAM not conflicting with the position of the register block is accessed without being repositioned.

It should be well understood that an internal address mapping apparatus improves the efficient operation of a microcomputer. By enabling the user to position memory resources in certain address ranges without losing access to any portion of those memory resources, a microcomputer may be more easily configured to function within that user's system. For example, if a user often accesses the I/O registers, placing the register block in the direct addressing mode address range would result in a savings of both program memory space and access time. Additionally, if a portion of the internal RAM was assigned to that direct addressing mode range, even more efficient system operation would occur as the amount of memory space and access time are lessened for even more operations. Although a portion of the internal RAM will not be positioned in the direct addressing mode range, the overall performance of the microcomputer will be enhanced. Similarly, other memory resources such as ROM, EPROM, and EEPROM may be positioned to further enhance the operation of the microcomputer system.

By now it should be apparent that them has been provided an improved internal address mapping apparatus which repositions memory resources located at the same address. If two memory resources are located at the same address location, the conflicting portion of the memory resource with the lower priority is reassigned to another address range. There are many additional configurations for implementing the invention described above. The number of memory resources is provided by way of example only. Additionally, the present invention functions independently of the number of map register portions and subsequent comparator and decoder implementations. As well, both the AND gate 54 and the address mapping decoder could be implemented in a variety of ways. The logic diagram illustrated in FIG. 5 provides only one form in which the function may be implemented.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

What is claimed is:

1. A data processor comprising:

an address bus;

a first resource coupled to the address bus and having an enable input;

a second resource coupled to the address bus and having an enable input; and an address mapper comprising:

map register means for storing a first digital value and a second digital value;

first comparator means coupled to the map register means and to the address bus for producing a first match signal if the first digital value and coupled to a first set of predetermined bits of an address on the address bus coupled to the first comparator means are identical;

first address decoder means coupled to receive the first match signal and coupled to a second set of predetermined bits of the address on the address bus, the first address decoder providing a first enable signal to the enable input of the first resource if the first match signal is produced and if the second set of predetermined bits of the address on the address bus is within a first address range determined by the first digital value;

second comparator means coupled to the map register means and to the address bus for producing a second match signal if the second digital value and a third set of predetermined bits of the address on the address bus coupled to the second comparator means are identical; and second address decoder means coupled to receive the second match signal and coupled to a fourth set of predetermined bits, a fifth set of predetermined bits, and a sixth set of predetermined bits of the address on the address bus, the second address decoder means providing a second enable signal to the enable input of the second resource if the second match signal is produced, if the first match signal is not produced and if the fourth set of predetermined bits of the address on the address bus coupled to the second address decoder is within a second range of addresses determined by the second digital value;

wherein the improvement comprises:

the second address decoder means further comprising means for providing the second enable signal to the enable input of the second resource if the first digital value and the second digital value are identical and if the sixth set of predetermined bits of the address on the address bus coupled to the second address decoder means is within a third range of addresses, the third range of addresses being an overlapping portion of the first range of addresses and the second range of addresses.

2. The data processor of claim I wherein the first resource further comprises:

a first local address decoder coupled to the enable input and to the address bus.

3. The data processor of claim 2 wherein the second resource further comprises:

a second local address decoder coupled to the enable input and to the address bus.

4. The data processor of claim 1 wherein the second address decoder means further comprises:

an AND gate coupled to receive the first and second match signals.

5. A microcomputer comprising:

an address bus having a plurality of address lines, the number of address lines defining a first address space of the microcomputer;

a first resource having a second address space smaller than the first address space of the microcomputer;

a second resource having a third address space smaller than the first address space of the microcomputer; and an address mapper comprising:

map register means for holding a first digital value and a second digital value, the first digital value indicating a starting address of the first address space and the second digital value indicating a starting address of the second address space;

first resource enabling means for enabling the first resource if an address on the address bus is within a first range of addresses defined by the first digital value and the second address space;

second resource enabling means for enabling the second resource if the first resource enabling means is not enabling the first resource and if the address on the address bus is within a second range of address defined by the second digital value and the third address space; and third resource enabling means for enabling the second resource if the first digital value and the second digital value are identical and if the address on the address bus is within a fourth range of addresses, a starting address of the fourth range of addresses being a next address after the second range of addresses and a length of the fourth range of addresses being defined by the third address space.

6. The microcomputer of claim 5 wherein the first resource enabling means further comprises:

a first comparator having inputs coupled to receive the first digital value and a portion of the address on the address bus coupled to the first comparator, the first comparator having a first compare output; and first decoder means having an input coupled to the first compare output of the first comparator means and a plurality of inputs coupled to receive a portion of the address on the address bus coupled to the first decoder, the first decoder means providing a first decoded output signal.

7. The microcomputer of claim 6 wherein the second resource enabling means further comprises:

means for receiving the first decoded output signal from the first decoder means and for selectively disabling the second resource in response to the decoded output signal;

a second comparator having inputs coupled to receive the second digital value and a portion of the address on the address bus coupled to the second comparator, the second comparator having a second compare output; and second decoder means having an input coupled to the first compare output of the first comparator means and a plurality of inputs coupled to receive a portion of the address on the address bus coupled to the second decoder means.

8. The microcomputer according to claim 7 wherein the second mapping decoder further comprises:

an AND gate having inputs coupled to the first compare output of the first comparator and to the second compare output of the second comparator.

9. In a microcomputer having a first and a second resource and an address bus, a method of enabling one of the first and second resources in response to an address on the address bus comprising the steps of:

storing a first and a second digital value, the first digital value defining a first starting address and the second digital value defining a second starting address;

enabling the first resource if the address is within a first address range determined by the first digital value and a first memory space size of the first resource;

enabling the second resource if the address is within a second address range determined by the second digital value and a second memory space size of the second resource and if the first resource is not also enabled in response to the address; and enabling the second resource when the address is within a third address range and when the first and second digital values define a fourth address range in which the first resource is enabled and the second resource would be enabled except that the first resource is enabled, a starting address of the fourth address range being a next address after the second address range and a length of the fourth address range being defined by the third address range.

* * * * *